Aug. 28, 1962
FUMIO SATO
3,051,012
SHIFTING MECHANISM BETWEEN INCH AND METRIC SYSTEM
THREADING FEEDS FOR SCREW THREAD
CUTTING ON MACHINE TOOLS
Filed July 7, 1960
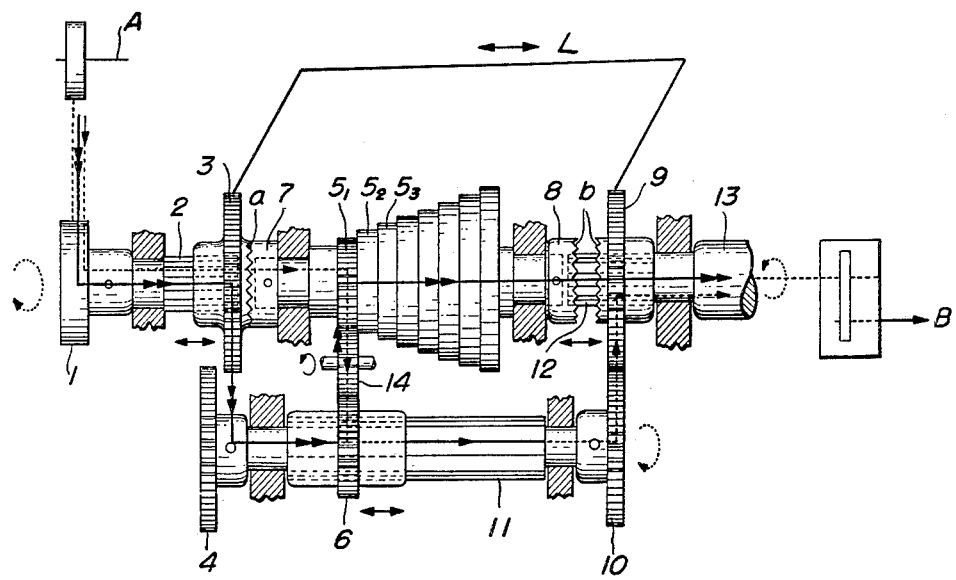

United States Patent Office 3,051,012
Patented Aug. 28, 1962

3,051,012
SHIFTING MECHANISM BETWEEN INCH AND METRIC SYSTEM THREADING FEEDS FOR SCREW THREAD CUTTING ON MACHINE TOOLS
Fumio Sato, Nagoya-shi, Japan, assignor to Kabushiki Kaisha Okuma Tekkosho, Kita-ku, Nagoya-shi, Japan, a corporation of Japan
Filed July 7, 1960, Ser. No. 41,382
6 Claims. (Cl. 74—354)

The present invention relates to mechanisms to select inch or metric system threading feeds in a machine tool.

According to the present invention, there is provided a shifting mechanism for shifting between inch and metric system threading feeds in a machine tool, said mechanism being characterized in that two identical pairs of shift gears on the input and output sides of a Norton gear train are arranged to be simultaneously shifted by means of a single shifting lever, the numbers of teeth in each pair of said shift gears being selected to correspond to respective values approximate to those calculated from the relation:

$$\left(\frac{Z_1}{Z_2}\right)^2 \times \left(\frac{Z_3}{Z_i}\right)^2 = \frac{25.4}{P_1 \times P_2}$$

where $Z_1$ is the number of teeth in one of each pair of said shift gears, $Z_2$ that of the other shift gears, $Z_3$ that of a slide gear slidably mounted on a splined shaft so as to be engaged by any selected one of said speed change gears, $Z_i$ that of said selected gear, $P_1$ the number of threads per inch given by inch system threading feed, and $P_2$ the pitch in millimeters given by the metric system threading feed. As will be fully described hereinafter, such shifting mechanism according to the present invention may thus be designed so that the shift gears in each pair may have respective numbers of teeth as calculated from the formula:

$$\left(\frac{7 \times 3 \times 3 \times t}{2 \times 5 \times 5 \times u}\right)^2 \times \left(\frac{u \times S}{t \times S}\right)^2$$

where $7 \times 3 \times 3 \times t = Z_1$, $2 \times 5 \times 5 \times u = Z_2$, $u \times S = Z_3$ and $t \times S = Z_i$, $S$ being a common integer, with four threads per inch corresponding to a pitch of four millimeters selected as a pair of corresponding inch and metric system threading feeds for reference.

Further objects and advantages will become apparent from the following detailed description with reference to the accompanying drawing in which the sole FIGURE illustrates one preferred embodiment of the present invention in a somewhat schematic manner.

In the drawing, A designates a drive shaft, 1 an input gear driven from the shaft A through a change gear train of a gear ratio of $x$ and fastened to a splined shaft 2 which slidably carries a clutch element comprising clutch teeth $a$ and an integral gear wheel 3 having the number of teeth of $Z_1$, and forming one of the shift gears on the output side of speed change gears $5_1$, $5_2$, $5_3$, etc. The gear wheel 3 is shown in engagement with a cooperating clutch element 7 which is fastened on a shaft carrying the speed change gears. A gear 4 is disposed to mesh with the gear 3 as the clutch element carrying the latter is shifted out of engagement with the clutch element 7 and has the number of teeth of $Z_2$. Provided on the output side in alignment with the splined shaft 2 is an output shaft 13 integral with a splined shaft 12. Another clutch device is provided on the output side which comprises a clutch element 8 fastened on the shaft carrying the speed change gears $5_1$, $5_2$, $5_3$, etc. and a cooperating clutch element slidably mounted on said splined shaft 12 and comprising clutch teeth $b$ and an integral gear 9, which is identical with the gear 3 on the input side thus having teeth of $Z_1$ in number. The identical gears 3 and 9 are adapted to be axially shifted at the same time by means of a mono lever diagrammatically indicated at L and movement of which is indicated by the double-headed arrow in the drawing. The clutch element carrying the gear 9 is shown out of engagement with the cooperating clutch element 8 and in mesh with a gear 10 identical with the corresponding gear 4 on the same shaft. Disposed between the two identical shift gears 3 and 9 are the train of speed change gears $5_1$, $5_2$, $5_3$, etc. having respective numbers of teeth $Z_i$ and having the above-described clutch elements 7 and 8 at the opposite ends of the train. Slidably mounted on the splined shaft 11 having gears 4 and 10 fast thereon at the opposite ends is a slidable engaging gear having the number of teeth of $Z_3$ and adapted to be placed in mesh through gear 14 with any selected one of said speed change gears $5_1$, $5_2$, $5_3$, etc. through an idle gear 14 shiftable with gear 6. Gear 14 is a pinion gear between the speed change gears $5_1$, $5_2$, $5_3$, etc., and gear 6 for the purpose of rotating gear 6 in the same direction as the speed change gears. The output shaft 13 is connected to a lead screw B of the thread cutting mechanism through the intermediary of a gearing having a gear ratio $y$. Assume that the lead screw B has a screw thread of a pitch P in millimeters or of N threads per inch. The drawing shows the embodiment as set for cutting metric system screw threads.

In operation, power is transmitted as indicated by the single arrows in the drawing to provide a threading feed of $P_2$ in millimeters. When the shift gears 3 and 9 are slidably shifted at the same time by the single lever so as to engage the clutch device 8—9 and disengage the clutch 3—7 while placing the gear 3 in mesh with the gear 4 and moving the gear 9 clear of the gear 10, power is transmitted as indicated by the double arrows in the drawing to provide a threading feed to form inch system screw threads having the number of threads per inch of $P_1$. It will be readily understood that $P_1$ and $P_2$ should satisfy the following Equations A and B, respectively.

$$X \times \frac{Z_1}{Z_2} \times \frac{Z_3}{Z_i} \times y \times P = \frac{25.4}{P_1} \quad \text{(A)}$$

$$X \times \frac{Z_i}{Z_3} \times \frac{Z_2}{Z_1} \times y \times P = P_2 \quad \text{(B)}$$

By dividing both sides of (A) by respective sides of (B), a relation $$\left(\frac{Z_1}{Z_2}\right)^2 \times \left(\frac{Z_3}{Z_i}\right)^2 = \frac{25.4}{P_1 \times P_2} \quad \text{(C)}$$

is obtained. This forms a necessary and sufficient condition for determining numbers of teeth in the shifting mechanism of the invention.

In actual design, any pair of corresponding inch and metric system threading feeds in threads per inch $P_1$ and in millimeters $P_2$, respectively, may be selected for reference. By way of example it may be assumed that a combination of $P_1$ of four threads per inch and $P_2$ of four millimeters is selected to correspond to each other. A relation is then obtained from the equation (C) as follows:

$$\left(\frac{Z_1}{Z_2}\right)^2 \times \left(\frac{Z_3}{Z_i}\right)^2 = \frac{25.4}{4 \times 4} = 1.587500 \quad \text{(D)}$$

First, in a special case where $$\left(\frac{Z_3}{Z_i}\right) = 1$$

integers may be selected as follows for $Z_1$ and $Z_2$ to satisfy the relation (D) as completely as possible:

$$\left(\frac{7 \times 3 \times 3}{2 \times 5 \times 5}\right)^2 = \left(\frac{63}{50}\right)^2 = \left(\frac{Z_1}{Z_2}\right)^2$$

$$\left(\frac{Z_1}{Z_2}\right)^2 = 1.587600 \quad \text{(E)}$$

Since the difference between the right-hand sides of (D) and (E) is only 0.000100, the accuracy in cutting screw threads of a length of 300 millimeters is $$300 \times \frac{0.000100}{1.587500} = 0.0188 \text{ mm.}$$

This accuracy corresponds to the amount of error which occurs when the machine is set for a threading feed for cutting inch system screw threads, assuming that the lead screw had screw threads of the metric system. It will be understood that, when the machine is shifted for cutting metric system screw threads, there occurs no error at all in the screw thread formed. Similarly, where the lead screw has screw threads of the inch system, no error occurs when the machine is set to cut inch system screw threads while the same error as described above will occur when the machine is shifted for cutting metric system screw threads. Thus it will be appreciated that according to the present invention an accuracy is provided which is well within the limits of allowance for the 300 millimeter length of screw thread as specified in the Japanese Industrial Standards (JIS).

In the above calculation, a special case where $$\frac{Z_3}{Z_i} = 1$$

has been considered. Another example which can readily be inferred will now follow.

Assume that $$\frac{Z_3}{Z_i} = \frac{9}{8}$$

and a relation $$\left(\frac{7 \times 3 \times 3}{2 \times 5 \times 5} \times \frac{8}{9}\right)^2 \times \left(\frac{9}{8}\right)^2 = \left(\frac{56}{50}\right)^2 \times \left(\frac{9}{8}\right)^2$$

is obtained which gives $$Z_1 = 56; \; Z_2 = 50; \; Z_3 = 9 \text{ and } Z_i = 8$$

Two of these values obtained, i.e., $Z_3 = 9$ and $Z_i = 8$, are impractical per se and should be multiplied by a suitable integer $S$ to give desired actual numbers of teeth. For instance, employing $S=3$, $Z_3=27$ and $Z_i=24$ are obtained; and if $S=4$, $Z_3=36$ and $Z_i=32$ follow.

Similarly, if it is assumed that $$\frac{Z_3}{Z_i} = \frac{9}{7}$$

a formula is obtained as follows:

$$\left(\frac{7 \times 3 \times 3}{2 \times 5 \times 5} \times \frac{7}{9}\right)^2 \times \left(\frac{9}{7} \times \frac{S}{S}\right)^2 = \left(\frac{49}{50}\right)^2 \times \left(\frac{9 \times S}{7 \times S}\right)^2$$

which gives $Z_1 = 49$ and $Z_2 = 50$. If $S=3$, $Z_3=27$ and $Z_i=21$ are obtained while, if $S=4$, $Z_3=36$ and $Z_i=28$ obtained.

Thus, the Relation C is generally expressed as follows:

$$\left(\frac{Z_1}{Z_2}\right)^2 \times \left(\frac{Z_3}{Z_i}\right)^2 = \left(\frac{7 \times 3 \times 3 \times t}{2 \times 5 \times 5 \times u}\right)^2 \times \left(\frac{u \times S}{t \times S}\right)^2 \quad \text{(F)}$$

and from which respective numbers of teeth may be determined by the following formulae:

$$Z_1 = 7 \times 3 \times 3 \times t$$
$$Z_2 = 2 \times 5 \times 5 \times u$$
$$Z_3 = u \times S \text{ and}$$
$$Z_i = t \times S$$

It is also possible to determine values approximate to those given by the Relation C by selecting a pair of corresponding inch and metric system threading feeds, such as four threads per inch and 6 millimeter pitch, or eight threads per inch and 6 millimeter pitch, for reference.

It will be appreciated from the foregoing description that, according to the present invention, by employing shift gears having respective numbers of teeth $$\left(\frac{Z_1}{Z_2}\right) \times \left(\frac{Z_3}{Z_i}\right)$$

as given by the general formula, a threading feed having an accuracy well within the limits of allowance as specified by the standards may be effected. Furthermore, this shifting gear mechanism is also very excellent in that it utilizes two identical pairs of shift gears, a single output shaft and also a mono lever, so that the number of parts is minimized while reasonably simplifying the entire construction of the mechanism.

What is claimed is:

1. A shifting mechanism for converting between the inch and metric system and enabling the selective cutting of threads of $P_1$ threads per inch and of threads having a pitch of $P_2$ millimeters, said mechanism comprising: a first driveshaft, gear means on the first driveshaft and rotatable therewith, a second driveshaft, an engaging gear on the second driveshaft and rotatable therewith, the latter said gear being engaged in driving relation with the gear means, a first pair of gears coaxial with respect to said first driveshaft, a second pair of gears on said second driveshaft, means coupled to said first pair of gears for sliding the same axially and in unison between a first and second position, one of said gears from each of the pairs being engaged in driving relation in each of said positions, and clutch means alternately engaging a respective one of the gears of the first pair in driving relation with said driveshaft in response to the axial displacement of said first pair of gears, the gear means and said engaging gear on the second driveshaft including teeth in the ratio of $Z_i/Z_3$ the pair of gears on the first and second driveshafts including teeth in the ratio of $Z_1/Z_2$ respectively, the teeth being in the following relationship $$\left(\frac{Z_1}{Z_2}\right)^2 \left(\frac{Z_3}{Z_i}\right)^2 = \frac{25.4}{P_1 P_2}$$

2. A shifting mechanism as claimed in claim 1 wherein the gear means is constituted by a plurality of gears, said mechanism further comprising a pinion gear engaging one of said plurality of gears, the engaging gear on the second driveshaft being slidable thereon for engaging said pinion gear.

3. A shifting mechanism for converting between the inch and metric system and enabling the selective cutting of threads of $P_1$ threads per inch and of threads having a pitch of $P_2$ millimeters, said mechanism comprising: a first driveshaft, means operatively coupled to the first driveshaft and responsive thereto for cutting threads, clutch means on said first driveshaft, gear means on said first driveshaft and rotatable therewith, a pair of gears slidably supported coaxially of said first driveshaft and selectively rotatable therewith, means for sliding said pair of gears from a first to a second position, a second driveshaft parallel with respect to the first driveshaft, a pair of gears on the second driveshaft and rotatable therewith, a sliding gear on the second driveshaft, said sliding gear being rotatable with the second driveshaft and being engaged in driving relation with said gear means, one of the pair of gears on the second driveshaft being coupled to one of the pair of gears on the first driveshaft in the first position, the other of said pairs of gears being coupled in the second position, said clutch means in the first position coupling the other said gear of the first said pair with the first driveshaft, the clutch means in the second position coupling said one gear of the first pair of said gears with the first driveshaft, the gear means and said engaging gear on the second driveshaft including teeth in the ratio of $Z_1/Z_3$, the pair of gears on the first and second driveshaft including teeth in the ratio of $Z_1/Z_2$ respectively, the teeth being in the following relationship $$\left(\frac{Z_1}{Z_2}\right)^2\left(\frac{Z_3}{Z_1}\right)^2 = \frac{25.4}{P_1 P_2}$$

whereby with the pair of gears in one of said positions the means for cutting threads is adapted for cutting threads according to the inch system and with the pair of gears in the other position the means for cutting threads is adapted for cutting threads according to the metric system.

4. A shifting mechanism as claimed in claim 3 wherein with $P_1 = 4$ threads per inch and $P_2 = 4$ millimeters, $$Z_1 = 63t$$
$$Z_2 = 50u$$
$$Z_3 = uS$$
$$Z_1 = tS$$

where $t$, $u$, and S are common integers.

5. A shifting mechanism for converting between the inch and metric system and enabling the selective cutting of threads of $P_1$ threads per inch and of threads having a pitch of $P_2$ millimeters, said mechanism comprising: a first driveshaft, gear means on the first driveshaft and rotatable therewith, a second driveshaft, an engaging gear on the second driveshaft and rotatable therewith, the latter said gear being engaged in driving relation with the gear means, an input and output gear coaxial with respect to said first driveshaft, a pair of gears on said second driveshaft, the input and output gears being axially movable in unison between a first and second position, the input gear being engaged in driving relation with one of said pairs of gears in the first position and the output gear being engaged in driving relation with the other of said pair of gears in the second position, and clutch means selectively engaging said first driveshaft in driving relation with said input and output gears in dependence upon the respective position thereof whereby said output gear is driven at different speeds in each of said positions, one of said positions corresponding to a thread cutting speed for the metric system and the other of said positions corresponding to a thread cutting speed for the inch system.

6. A shiftable mechanism for selectively converting between the inch and metric system and enabling the cutting of threads corresponding thereto, comprising a set of speed change gears having an input and an output side, a first and second set of identical gears respectively provided on the input and output sides of the speed change gears, lever means coupled to the first and second set of gears for shifting the latter simultaneously between first and second positions, and means responsive to the gears in one position for cutting threads corresponding to one of the systems and in the other position for cutting threads corresponding to the other of said systems.

References Cited in the file of this patent
UNITED STATES PATENTS

| | | |
|---|---|---|
| 877,213 | Mill | Jan. 21, 1908 |
| 1,313,955 | Schneider | Aug. 26, 1919 |
| 1,475,350 | Marvin | Nov. 27, 1923 |
| 2,778,237 | Romi | Jan. 22, 1957 |
| 2,926,538 | Schafer | Mar. 1, 1960 |